(12) United States Patent
Song

(10) Patent No.: US 9,094,346 B2
(45) Date of Patent: Jul. 28, 2015

(54) METHOD AND SYSTEM FOR MANAGING PROTOCOL CONNECTION IN PBB NETWORK AND BEB NODE

(75) Inventor: Xiaoheng Song, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 122 days.

(21) Appl. No.: 13/704,561

(22) PCT Filed: Jun. 29, 2011

(86) PCT No.: PCT/CN2011/076574
§ 371 (c)(1),
(2), (4) Date: Dec. 14, 2012

(87) PCT Pub. No.: WO2012/000436
PCT Pub. Date: Jan. 5, 2012

(65) Prior Publication Data
US 2013/0089096 A1    Apr. 11, 2013

(30) Foreign Application Priority Data
Jun. 29, 2010    (CN) .......................... 2010 1 0221824

(51) Int. Cl.
*H04L 12/721*    (2013.01)
(52) U.S. Cl.
CPC ............... *H04L 45/72* (2013.01); *H04L 45/68* (2013.01)
(58) Field of Classification Search
CPC .............................. H04L 45/72; H04L 45/68
See application file for complete search history.

(56) References Cited

U.S. PATENT DOCUMENTS

| 7,697,534 | B1 | 4/2010 | Narayanan et al. |
| 2006/0245436 | A1 | 11/2006 | Sajassi |
| 2007/0008982 | A1* | 1/2007 | Voit et al. ....................... 370/401 |
| 2008/0310417 | A1* | 12/2008 | Friskney et al. .............. 370/392 |
| 2010/0208615 | A1* | 8/2010 | Soon et al. ..................... 370/254 |

FOREIGN PATENT DOCUMENTS

| CN | 101552711 | 10/2009 |
| CN | 101552729 | 10/2009 |
| CN | 101631072 | 1/2010 |
| CN | 101674249 A | 3/2010 |
| CN | 101729274 A | 6/2010 |

OTHER PUBLICATIONS

K. Kompella, et al., "Virtual Private LAN Service (VPLS) Using BGP for Auto-Discovery and Signaling", IETF, Jan. 2007, pp. 1-23, RFC 4761.

(Continued)

*Primary Examiner* — Jae Y Lee
(74) *Attorney, Agent, or Firm* — Mannava & Kang, P.C.

(57) ABSTRACT

A method and system for managing protocol connection in a PBB network and a BEB node. A first BEB node in the PBB network receives a Pseudo Wire (PW) connection requesting message sent by a second BEB node which has a PBB instance. When it is determined according to the PW connection requesting message that the first BEB node has the same PBB instance as that of the second BEB node, the first BEB node sends a PW response message back to the second BEB node and establishes protocol connection between the first BEB node and the second BEB node for forwarding backbone frame.

20 Claims, 7 Drawing Sheets

(56) References Cited

OTHER PUBLICATIONS

CN First Office Action dated Oct. 18, 2013 issued on CN Patent Application No. 201010221824.3 dated Jun. 29, 2010, The State Intellectual Property Office, P.R. China.

Martini, Ed L., et al., "Pseudowire Setup and Maintenance Using the Label Distribution Protocol (LDP)", IETF, Apr. 2006, pp. 13-16, RFC 4447.

International Search Report for PCT/CN2011/076574, Chinese Intellectual Property Office, Oct. 20, 2011.

\* cited by examiner

METHOD AND SYSTEM FOR MANAGING PROTOCOL CONNECTION IN PBB NETWORK AND BEB NODE

CLAIM FOR PRIORITY

The present application is a national stage filing under 35 U.S.C 371 of PCT application number PCT/CN2011/076574, having an international filing date of Jun. 29, 2011, which claims priority to Chinese Patent Application No. 201010221824.3, filed on Jun. 29, 2010, the disclosures of which are hereby incorporated by reference in their entireties.

BACKGROUND OF THE DISCLOSURE

MAC-in-MAC standard defined in 802.1ah is adopted in a Provider Backbone Bridge (PBB) network. The basic idea of MAC-in-MAC is: encapsulating 802.1 ah header with a user Ethernet packet to form a backbone frame. In the PBB network, backbone frame is forwarded according to Backbone Source MAC address (B-SA) and Backbone Destination MAC address (B-DA) of B-MAC in the 802.1ah header.

DETAILED DESCRIPTION

Figure 1:
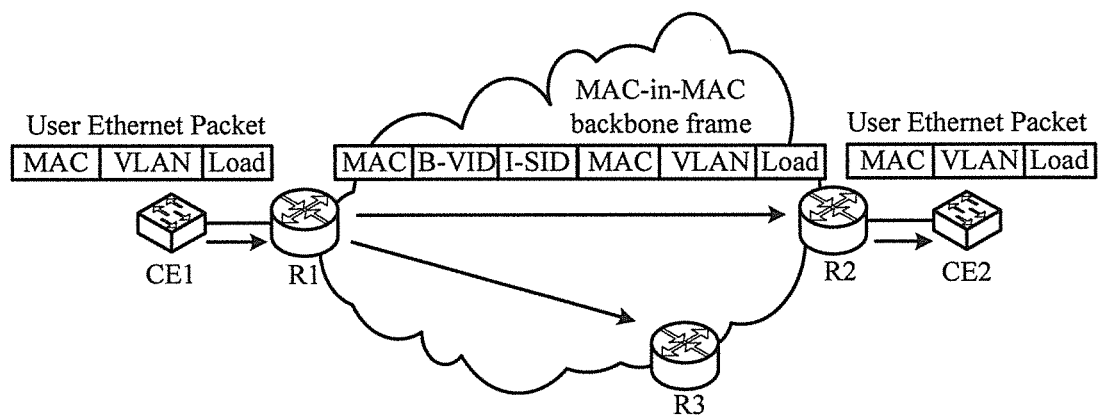
FIG. 1 is a schematic diagram illustrating principle of message forwarding in a PBB network.

FIG. 1 is a schematic diagram illustrating principle of backbone frame forwarding in a PBB network. As shown in FIG. 1, R1, R2 and R3 are Backbone Edge Bridge (BEB) nodes in the PBB network, all of which establish different PBB instances for providing different services. Customer Edge (CE) 1 and CE2 connect to R1 and R2 respectively via an Access Circuit (AC).

Specifically, CE1 forwards user Ethernet packet from user A, wherein the packet includes MAC, VLAN ID and Load, to R1 through the AC. In the user Ethernet packet, the MAC is a customer MAC address (C-MAC) including customer source MAC address (C-SA) and customer destination MAC address (C-DA), e.g. the C-SA is a MAC address of user A and the C-DA is a MAC address of user B.

After receiving the user Ethernet packet, R1 carries out MAC lookup within corresponding PBB instance established in R1 for the C-DA. If the C-DA is found within the corresponding PBB instance, the user Ethernet packet is encapsulated into a backbone frame with a 802.1ah header including MAC, B-VID, I-SID and load (i.e., the user Ethernet packet) by R1. In the backbone frame, the MAC is a backbone frame MAC (B-MAC) including Backbone Source MAC address (B-SA) and Backbone Destination MAC address (B-DA), e.g. the B-SA is a MAC address of R1 and the B-DA is a MAC address of R2. The backbone frame is forwarded to R2 within the corresponding PBB instance.

Then, R2 can remove the 802.1ah header of the backbone frame to obtain the user Ethernet packet and trigger MAC lookup within the corresponding PBB instance for the C-DA. If the C-DA is found within the corresponding PBB instance, the user Ethernet packet is forwarded to CE2 by R2 via the AC. Here, CE2 can forward the user Ethernet packet to user B by using existing methods.

If the C-DA is not found in the corresponding PBB instance, R1 will replicate the user Ethernet packet, encapsulate backbone frame by appending the 802.1ah header to each user Ethernet packet, and broadcast each encapsulated frame (the backbone frame including the 802.1ah header) on each uplink interface of the PBB instance, wherein B-SA and B-DA of B-MAC in the 802.1ah header are a MAC address of R1 and a broadcast MAC address (all F), respectively. The BEB nodes in the same corresponding PBB instance will pop out the 802.1ah header and perform MAC lookup in the corresponding PBB instance for the C-DA. If the uplink interfaces are shared with other PBB instances, the BEB nodes in the other PBB instances will receive the encapsulated frames and broadcast these encapsulated frames in the PBB network according to the 802.1ah header. Therefore, many invalid broadcast backbone frames may appear throughout the PBB network.

Figure 2A:
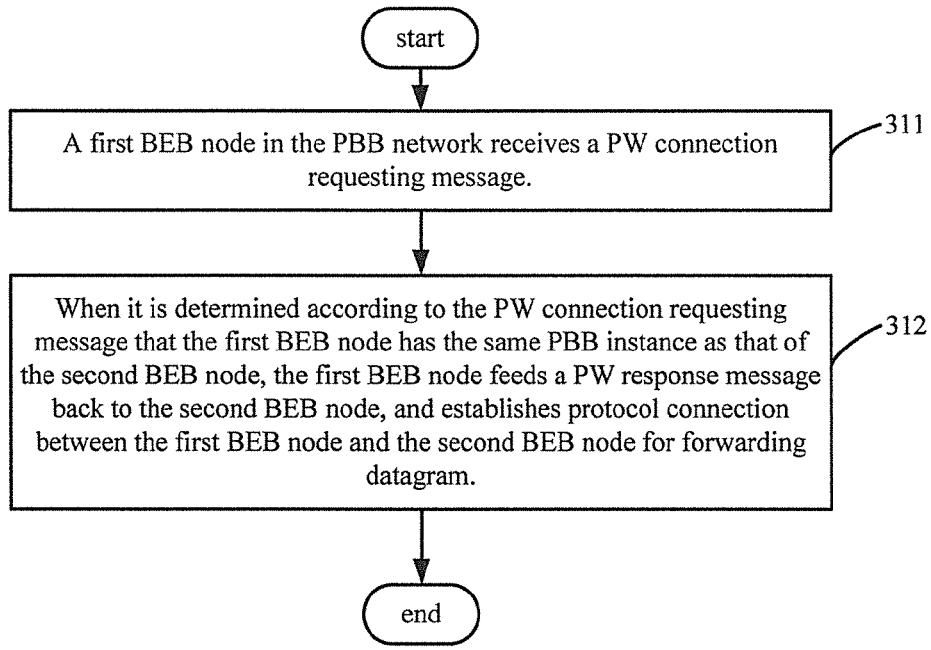
FIG. 2a is a flowchart illustrating a method for managing protocol connection in a PBB network according to one example.

In this way, a method for managing protocol connection in a PBB network for forwarding backbone frame effectively as shown in FIG. 2a is put forward in an example, including:

Step 311: a first BEB node in the PBB network receives a PW connection requesting message, wherein the PW connection requesting message is sent out by a second BEB node when the second BEB node has a PBB instance.

Step 312: when it is determined according to the PW connection requesting message that the first BEB node has the same PBB instance as that of the second BEB node, the first BEB node feeds a PW response message back to the second BEB node, and establishes protocol connection between the first BEB node and the second BEB node for forwarding backbone frame.

It should be noted that the first BEB node may be considered as a remote BEB node, and the second BEB node be considered as a local BEB node.

Furthermore, when the PBB instance of the second BEB node is deleted, the second BEB node constructs a PW notifying message, transmits the PW notifying message to the first BEB node, and deletes the second remote PW connection. Thereafter, the first BEB node receives the PW notifying message, and deletes the first remote PW connection when it is determined according to the PW notifying message that the first BEB node has the same PBB instance as that of the second BEB node being deleted and the PBB instance of the first BEB node includes the first remote PW connection to the second BEB node.

It can be seen that protocol connection management may include establishment of protocol connection, and further include deletion of protocol connection.

In an exemplary implementation, when a local BEB node of the PBB network has a PBB instance, the local BEB node constructs a PW connection requesting message and transmits it to a remote BEB node of the PBB network. If the remote BEB node has the same PBB instance as that of the local BEB node, a first remote PW connection to the local BEB node is established. Meanwhile, the remote BEB node constructs a PW response message and feeds it back to the local BEB node. The local BEB node receives the PW response message and establishes a second remote PW connection to the remote BEB node. It can be observed that before forwarding backbone frame, remote PW connections are established in advance between two BEB nodes having the same PBB instance, that is, protocol connection is carried out in the PBB network before forwarding backbone frame. In this way, remote PW connections contained in the PBB instance, which are established in advance, can be used for forwarding backbone frame. For example, as to unknown unicast and broadcast messages, protocol connection is firstly established, and then, backbone frame is transmitted to each of BEB nodes at the opposite end in a unicast mode, thereby to some extent eliminating invalid broadcast messages that may appear throughout the PBB network.

Figure 2B:
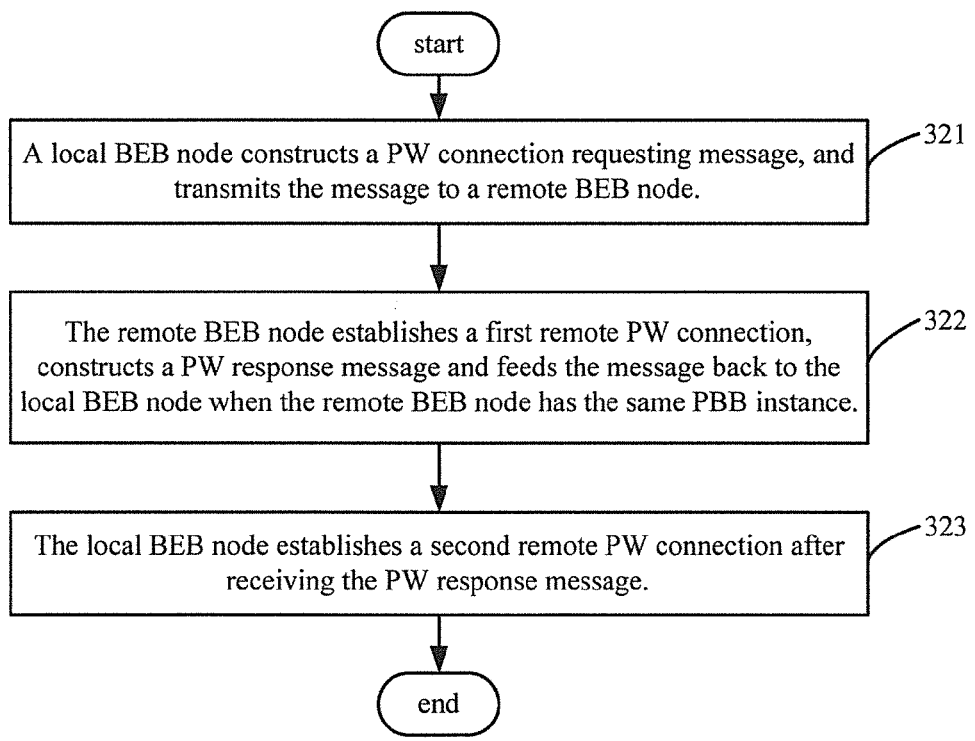
FIG. 2b is a flowchart illustrating a method for managing protocol connection in a PBB network according to another example.

FIG. 2b is a flowchart illustrating a method for managing protocol connection in a PBB network according to another example. As shown in FIG. 2b, the method includes the following steps.

Step 321: when a local BEB node has a PBB instance, the local BEB node constructs a PW connection requesting message, and transmits the message to one or more BEB nodes at the opposite end of a public network.

Step 322: as to each of the one or more BEB nodes at the opposite end, if the remote BEB node has the same PBB instance as that of the local BEB node, the remote BEB node establishes a first remote PW connection to the local BEB node. Further, the remote BEB node constructs a PW response message, and feeds the message back to the local BEB node.

Step 323: after receiving the PW response message, the local BEB node establishes a second remote PW connection to the remote BEB node sending out the PW response message. Thus, an exemplary procedure of managing protocol connection is finished.

It should be pointed out that a remote BEB node is any other BEB node of the PBB network except the local BEB node. Additionally, a remote BEB node can be considered as a first BEB node while a local BEB node can be considered as a second BEB node.

In order to give a clear explanation on the procedure of establishing protocol connection within a PBB network, a detailed example of the present disclosure is presented which uses the PBB network shown in FIG. 1 as an exemplary application scenario. In the example, R1 represents a local BEB node while R2 and R3 represent BEB nodes at the opposite end of R1. Referring to the detailed workflow illustrated in FIG. 3 for implementing protocol connection, it includes the following one or more steps.

Step 401: when R1 has a PBB instance, R1 constructs a PW connection requesting message and broadcasts the constructed PW connection requesting message within a public network.

In step 401, construction of the PW connection requesting message can be performed at the time when the PBB instance is initially established in R1, or can be periodically performed when the PBB instance has already been established in R1, or can be performed when CE1 connects to R1 via the AC and the PBB instance has already been established in R1. Generally, the PW connection requesting message can be constructed and broadcast when the PBB instance is initially established in R1. However, a PW connection in the PBB network has its aging period. If the PW connection requesting message is broadcast only once, the PW connection between some BEB nodes may not exist beyond the aging period. Therefore, it is better for R1 to periodically construct a PW connection requesting message and broadcast it in order to overcome the issue of PW connection aging. In an exemplary implementation, the period that the BEB node may construct and broadcast the PW connection requesting message can be set according to the aging period of the PW connection. As to the aging period, it may be determined according to such as network size or flow state, e.g., it may be 10 or 20 minutes, etc.

Figure 4:
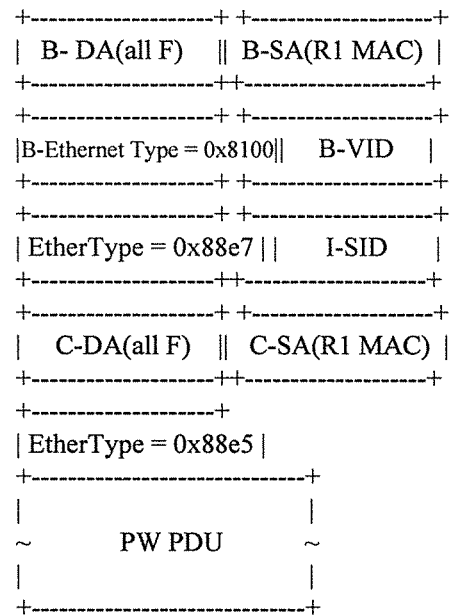
FIG. 4 is a schematic diagram illustrating the format of a PW connection requesting message according to an example.

It should be noted that in step 401, the PW connection requesting message is used for requesting establishment of a remote PW connection between BEB nodes, and the message can be encapsulated adopting a 802.1ah header encapsulation format. In an exemplary implementation, the format of the PW connection requesting message is as follows: the C-SA of the message is the MAC address of the BEB node sending out the PW connection requesting message, and the C-DA of the message is a broadcast MAC address. The PW connection requesting message is encapsulated with the 802.1ah header, which includes B-MAC, B-VID and I-SID. In the 802.1ah header, B-SA of the B-MAC is the MAC address of the BEB node sending out the PW connection requesting message, and B-DA of the B-MAC is a broadcast MAC address. FIG. 4 illustrates a specific format of the PW connection requesting message, wherein Ether Type=0x88e5 is used for specifying that subsequent content is a PW protocol data unit (PDU), and the PW PDU is an extended part of which the content is as shown in Table 2. Specifically, the Request Value field can be used for carrying bandwidth requirement of R1 for forwarding backbone frame.

TABLE 2

| Bits | Field | Value |
| --- | --- | --- |
| 8 | Protocol Version | 0x01 indicating that the protocol version number is 1 |
| 8 | Type | 0x01 for identifying PW related attribute information |
| 8 | Length | 0x04 for identifying that the total length of subsequence fields is 4 |
| 8 | PW Type (Request) | 0x01 identifying PW Request |
| 8 | Request Length | 0x01 for identifying that the length of Request field is 1 |
| 16 | Request Value | 0x0 for identifying the value of Request field |

When the PW connection requesting message is broadcast within the public network by R1, remote BEB nodes in the same PBB instance or the other PBB instances could receive the PW connection requesting message having the 802.1ah header, learn the MAC address of R1 and also broadcast the PW connection requesting message within the public network.

Step 402: when receiving the PW connection requesting message, R2 may also broadcast the message within the public network.

It should be noted that in step 402, the operation of R2 for broadcasting the PW connection requesting message is the same as that of R1. Also, the destination MAC of the broadcast PW connection requesting message is a broadcast MAC address (all F). Thus, the PW connection requesting message is most likely to be sent back to R1, thereby forming a loop. In order to prevent loop storm within the public network, protocols such as a Multiple Spanning Tree Protocol (MSTP) are configured in BEB nodes of the public network. How to configure a protocol on a BEB node for preventing a loop is not described in detail here, which can refer to the conventional art.

Step 403 can be performed at the same time as step 402. In step 403, it is determined whether R2 has a PBB instance or not. If R2 has a PBB instance, proceed to step 404; otherwise, the procedure of establishing protocol connection between R1 and R2 is ended.

It should be pointed out that steps in a procedure are numbered to facilitate indication of the steps when describing an example of the present disclosure, and numbering of the steps can not be considered as a restriction on execution sequence of the steps. For example, steps 402 and 403 are two parallel executed steps instead of two successively executed steps.

Step 404: R2 determines whether the PBB instance established in itself is the same as that of R1, and if the two PBB instances are the same, proceed to step 405. Otherwise, the procedure of establishing protocol connection between R1 and R2 is ended.

In step 404, when R2 has an established PBB instance, R2 further determines whether the two PBB instances are the same or not. One specific way of determination is as follows: R2 fetches I-SID from the PW connection requesting message, and determines whether the I-SID contained in the PW connection requesting message is the same as the I-SID of the PBB instance established in R2. If the two I-SIDS are the same, it means that the two PBB instances are the same as well; otherwise, it means that the two PBB instances are different.

Step 405: R2 establishes a first remote PW connection to R1, constructs a PW response message and feeds the message back to R1.

When R1 transmits the PW connection requesting message periodically, the first remote PW connection between R2 and R1 may not be in an aging state each time R2 receives the PW connection requesting message. Then, it is not necessary to reestablish the first remote PW connection each time R2 receives the PW connection requesting message. Instead, R2 can directly construct a PW response message and feed the constructed PW response message back to R1 without establishing the first remote PW connection. However, when it is the first time for R1 to send the PW connection requesting message to R2, the step of establishing the first remote PW connection can not be omitted in R2.

In step 405, R2 establishes a first remote PW connection to R1 is actually to establish a forwarding table on R2 which includes a tunnel termination table and a local forwarding table. How to establish the forwarding table can refer to the conventional art and is not described repeatedly here.

It should be noted that during transmission of the PW connection requesting message from R1 to R2, BEB nodes on the way of transmission have learned the MAC of R1. Therefore, the PW response message sent out by R2 can be fed back to R1 via a unicast mode.

Figure 5:
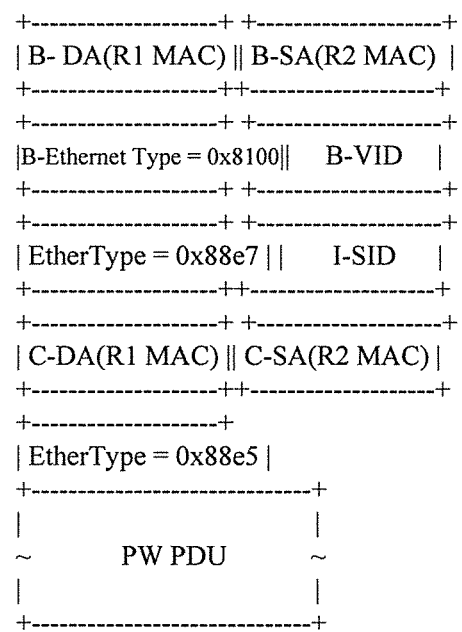
FIG. 5 is a schematic diagram illustrating the format of a PW response message according to an example.

It should also be noted that in step 405, a 802.1ah header encapsulation format may be adopted for constructing the PW response message, wherein an inner-MAC header is simply a "MAC header" prior to encapsulation while an outer-MAC header is a "802.1ah header" after encapsulation. Moreover, the PW response message is different from the PW connection requesting message in that the PW response message is a unicast message with a format as shown in FIG. 5. In FIG. 5, the specific content of the PW PDU included in the PW response message is shown in Table 3. Specifically, after receiving the PW connection requesting message, R2 obtains bandwidth requirement of R1 from the Request Value field. If the bandwidth requirement can be satisfied in R2, R2 will configure its bandwidth for forwarding backbone frame according to the bandwidth requirement, and feeds the configured bandwidth back to R1, wherein the configured bandwidth is carried in the Reply Value field of the PW response message as an available bandwidth of R2 for forwarding backbone frame. In other cases, R2 may not meet the bandwidth requirement of R1. Then, R2 can fill its actual bandwidth into the Reply Value field of the PW response message as the available bandwidth of R2 for forwarding backbone frame, and feed the actual bandwidth back to R1 to provide guidance for bandwidth configuration of R1.

TABLE 3

| Bits | Field | Value |
| --- | --- | --- |
| 8 | Protocol Version | 0x01 indicating that the protocol version number is 1 |
| 8 | Type | 0x01 for identifying PW related attribute information |
| 8 | Length | 0x04 for identifying that the total length of subsequence fields is 4 |
| 8 | PW Type (Reply) | 0x02 identifying PW Reply |
| 8 | Reply Length | 0x01 for identifying that the length of Reply field is 1 |
| 16 | Reply Value | 0x0 for identifying the value of Reply field |

Step 406: R1 establishes a second remote PW connection to R2 after receiving the PW response message.

In step 406, R1 establishes the second remote PW connection to R2 is actually to establish a forwarding table in R1, which can refer to the conventional art as with step 405 and is not described repeatedly here. After the first remote PW connection and the second remote PW connection are established, the protocol connection between R1 and R2 is implemented accordingly.

Similarly, R3 may also execute the same procedure as steps 402-406 after receiving the PW connection requesting message which is not described repeatedly here. It is shown clearly that any remote BEB node of the PBB network can perform the above mentioned steps 402-406. Then, the procedure for establishing protocol connection in the PBB network according to an example is finished.

Figure 3:
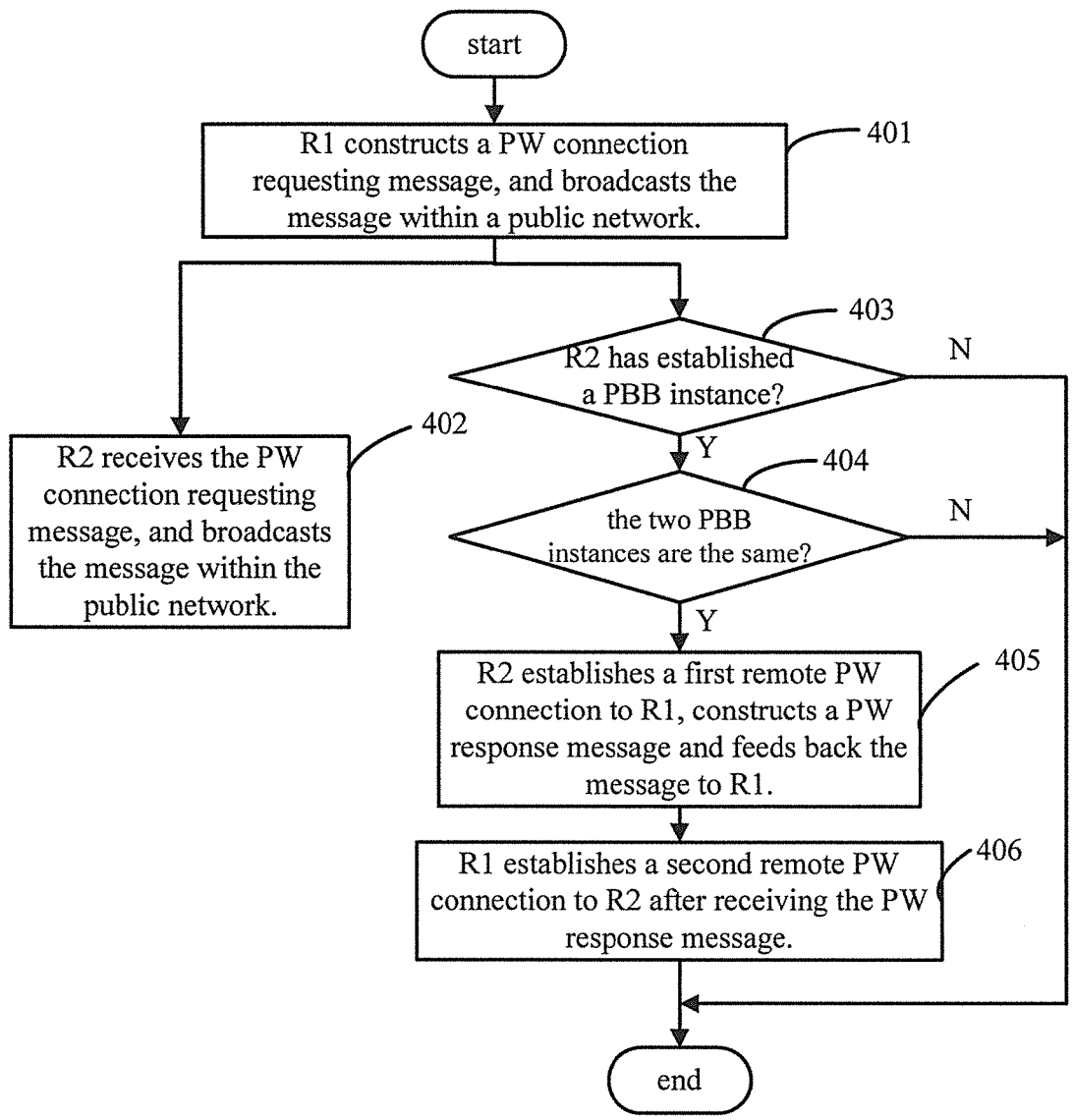
FIG. 3 illustrates a detailed workflow for establishing protocol connection according to an example.

In the example illustrated in FIG. 3, the PW connection requesting message is transmitted via a broadcast mode. In a real PBB network, BEB nodes at the opposite end may be statically customized in an established PBB instance of a certain BEB node. For example, it can be customized beforehand in a PBB instance of R1 that BEB nodes in the opposite are R2 and/or R3. Then, R1 can transmit a PW connection requesting message to R2 and/or R3 through a unicast mode. Here, the destination MAC of the PW connection requesting message is the MAC of R2 and/or R3, and the source MAC is the MAC of R1; the MAC-in-MAC tunnel encapsulated in the outer-MAC header is a unicast tunnel.

After remote PW connections between R1 and R2 and/or between R1 and R3 are respectively established, R1 will use the established remote PW connections to transmit backbone frame entering into R1 from a CE to R2 and/or R3. The destination MAC of the MAC-in-MAC tunnel header of the backbone frame entering in the public network is a unicast MAC of R2/R3. Therefore, the backbone frame is unicast to R2/R3 within the public network, thereby avoiding a broadcast within the whole Backbone Virtual Local Area Network (BVLAN) when the destination MAC is set as multicast or broadcast. In this way, invalid broadcast messages will be eliminated throughout the PBB network.

Figure 6:
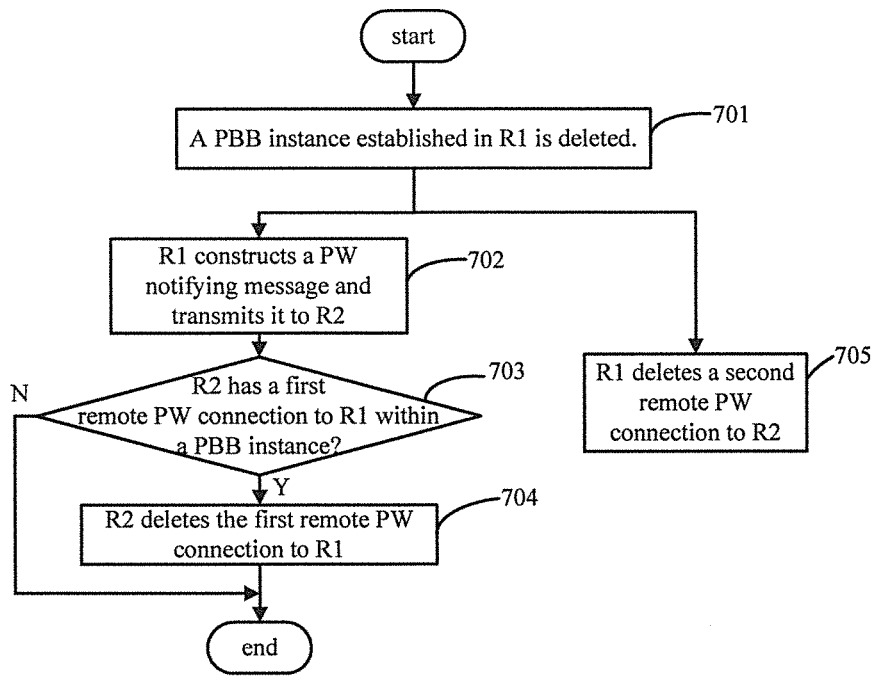
FIG. 6 is a flowchart illustrating a method for deleting remote PW connection according to an example.

The above mentioned procedure for establishing protocol connection is carried out when R1 has an established PBB instance. When the PBB instance established in R1 is deleted, a first remote PW connection and a second remote PW connection between R1 and each of BEB nodes at the opposite end of R1 established beforehand are to be deleted. FIG. 6 is a flowchart illustrating a method for deleting remote PW connections according to an example, and the procedure includes the following one or more steps.

Step 701: a PBB instance established in R1 is deleted.

Step 702: R1 constructs a PW notifying message, and transmits the constructed PW notifying message to R2.

Figure 7:
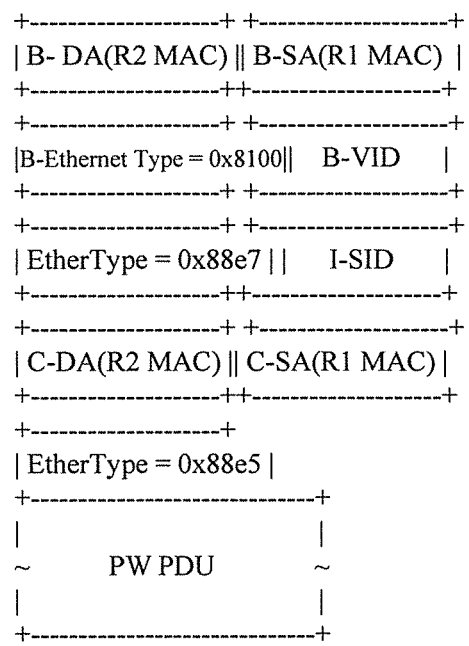
FIG. 7 is a schematic diagram illustrating the format of a PW notifying message according to an example.

When the PBB instance established in R1 is deleted, R1 needs to construct a PW notifying message for informing BEB nodes at the opposite end which have established remote PW connects to R1. The PW notifying message, which can be a unicast message, is encapsulated by using a 802.1ah header encapsulation format. An exemplary format of the PW notifying message is as shown in FIG. 7, wherein the source MAC is the MAC of R1 and the destination MAC is the MAC of R2, and the specific content of PW PDU contained in the PW notifying message is as shown in Table 4.

TABLE 4

| Bits | Field | Value |
| --- | --- | --- |
| 8 | Protocol Version | 0x01 indicating that the protocol version number is 1 |
| 8 | Type | 0x01 for identifying PW related attribute information |
| 8 | Length | 0x04 for identifying that the total length of subsequence fields is 4 |
| 8 | PW Type (Notify) | 0x03 identifying PW Notify |
| 8 | Notify Length | 0x01 for identifying that the length of Notify field is 1 |
| 16 | Notify Value | 0x0 for identifying the value of Notify field |

Step 703: after receiving the PW notifying message, R2 determines whether it has the same PBB instance as that deleted by R1, and whether the PBB instance includes the first remote PW connection to R1. If yes, proceed to step 704; otherwise, end the procedure.

In step 703, R2 determines whether it has the same PBB instance as that deleted by R1 and whether the PBB instance includes the first remote PW connection to R1 are specifically performed as follows. R2 fetches I-SID from the PW notifying message, and compares the fetched I-SID with the I-SID of the locally stored PBB instance. When these two I-SIDs are the same, R2 further searches whether there is a first remote PW connection to R1 which is stored in R2. For example, R2 can search whether it has a forwarding table which includes a tunnel termination table and a local forwarding table. If the forwarding table exists, it means that R2 has the first remote PW connection to R1; otherwise, it means that no first remote PW connection exists between R2 and R1. Specifically, R2 may traverse all remote PW connections contained in the PBB instance, and determine whether there is a remote PW connection recording control information of R1, such as the control MAC of R1. If yes, it means that R2 has the first remote PW connection to R1. That is, when it is required to delete a remote PW connection, the control MAC of the remote PW connection can be obtained from the PW notifying message. Thereafter, the remote PW connection is searched out according to its control MAC from the corresponding PBB instance by traversal, and the tunnel termination table and local forwarding table of the remote PW connection can be deleted accordingly.

Step 704: R2 deletes the first remote PW connection to R1.

In step 704, when R2 has the first remote PW connection to R1, it deletes a forwarding table stored in itself which includes the tunnel termination table and the local forwarding table corresponding to the first remote PW connection. In this way, the first remote PW connection between R2 and R1 is deleted.

Step 705: R1 deletes the second remote PW connection to R2 at the same time when executing step 702.

In step 705, when the corresponding forwarding table which includes the tunnel termination table and the local forwarding table stored in R1 is deleted, the second remote PW connection to R2 is meant to be deleted. In an exemplary implementation, the second remote PW connection or correspond forwarding table can be found via the control MAC of R2.

In the procedure, steps 702 and 705 can be parallel executed and have no sequence. Further, steps in the procedure are numbered to facilitate indication of the steps when describing an example of the present disclosure, and numbering of the steps can not be considered as a restriction on execution sequence of the steps.

Similarly, the PW notifying message constructed by R1 can be transmitted to other BEB nodes at the opposite end such as R3, and the specific procedure is the same as that of steps 702-705 which is not described repeatedly here. It is shown clearly that any remote BEB node of the PBB network can perform the above mentioned steps 702-705. Then, the procedure for deleting remote PW connections according to an example is finished.

When a remote PW connection contained in the PBB instance of R1 is deleted, R1 may not broadcast backbone frame to a remote BEB node. The backbone frame is only broadcast within local ACs. In the meantime, backbone frame of the remote BEB node may not be transmitted to local ACs of R1, as well.

Based on the above mentioned methods, a system for implementing protocol connection in a PBB network is provided in an example.

The system includes: a local BEB node, adapted to construct a PW connection requesting message when the local BEB node has a PBB instance, and transmit it to a remote BEB node of the PBB network; receive a PW response message sent out from the remote BEB node, and establish a second remote PW connection to the remote BEB node;

the remote BEB node, adapted to receive the PW connection requesting message, establish a first remote PW connection to the local BEB node when it is determined according to the PW connection requesting message that the remote BEB node has the same PBB instance as that of the local BEB node of the PBB network, construct the PW response message and feed it back to the local BEB node.

Here, the local BEB node is adapted to construct a PW connection requesting message when the local BEB node has a PBB instance includes:

the local BEB node constructs the PW connection requesting message when the PBB instance is established; or the local BEB node periodically constructs the PW connection requesting message when the PBB instance has already been established.

Specifically, the remote BEB node determines according to the PW connection requesting message that the remote BEB node has the same PBB instance as that of the local BEB node includes:

the remote BEB node fetches or obtains service identifier number (I-SID) from the PW connection requesting message, and determines that the remote BEB node has the same PBB instance as that of the local BEB node when the I-SID contained in the PW connection requesting message is the same as the I-SID of the PBB instance of the remote BEB node.

Further, the local BEB node is adapted for constructing a PW notifying message when the PBB instance of the local BEB node is deleted, transmitting the PW notifying message to the remote BEB node, and deleting the second remote PW connection to the remote BEB node.

The remote BEB node is further adapted for receiving the PW notifying message, and deleting the first remote PW connection when it is determined according to the PW notifying message that the remote BEB node has the same PBB instance as that of the local BEB node being deleted and the PBB instance of the remote BEB node includes the first remote PW connection to the local BEB node.

Specifically, the remote BEB node is adapted for fetching the I-SID from the PW notifying message, and determining that the PBB instance of the remote BEB node includes the first remote PW connection when the I-SID contained in the PW notifying message and the I-SID of the PBB instance of the remote BEB node are the same and the PBB instance of the remote BEB node stores a forwarding table including a tunnel termination table and a local forwarding table.

In an exemplary implementation, a 802.1ah header encapsulation format can be adopted for encapsulating or constructing a protocol message such as the PW connection requesting message, the PW response message or the PW notifying message.

Specifically, the PW connection requesting message is transmitted in a broadcast mode or in a unicast mode; and the PW response message and the PW notifying message are transmitted in a unicast mode.

In an example, a system for managing protocol connection in Provider Backbone Bridge (PBB) network includes:

a first Backbone Edge Bridge (BEB) node, adapted for receiving a Pseudo Wire (PW) connection requesting message, and when it is determined according to the PW connection requesting message that the first BEB node has the same PBB instance as that of a second BEB node in the PBB network, establishing a first remote PW connection to the second BEB node, constructing a PW response message and feeding the PW response message back to the second BEB node; and the second BEB node is adapted for constructing the PW connection requesting message when the second BEB node has a PBB instance, transmitting the PW connection requesting message to the first BEB node, and establishing a second remote PW connection to the first BEB node after receiving the PW response message from the first BEB node.

Moreover, specific work flow of the system can be found in such as FIG. 3 and FIG. 6, which may not be described repeatedly hereinafter.

Figure 8A:
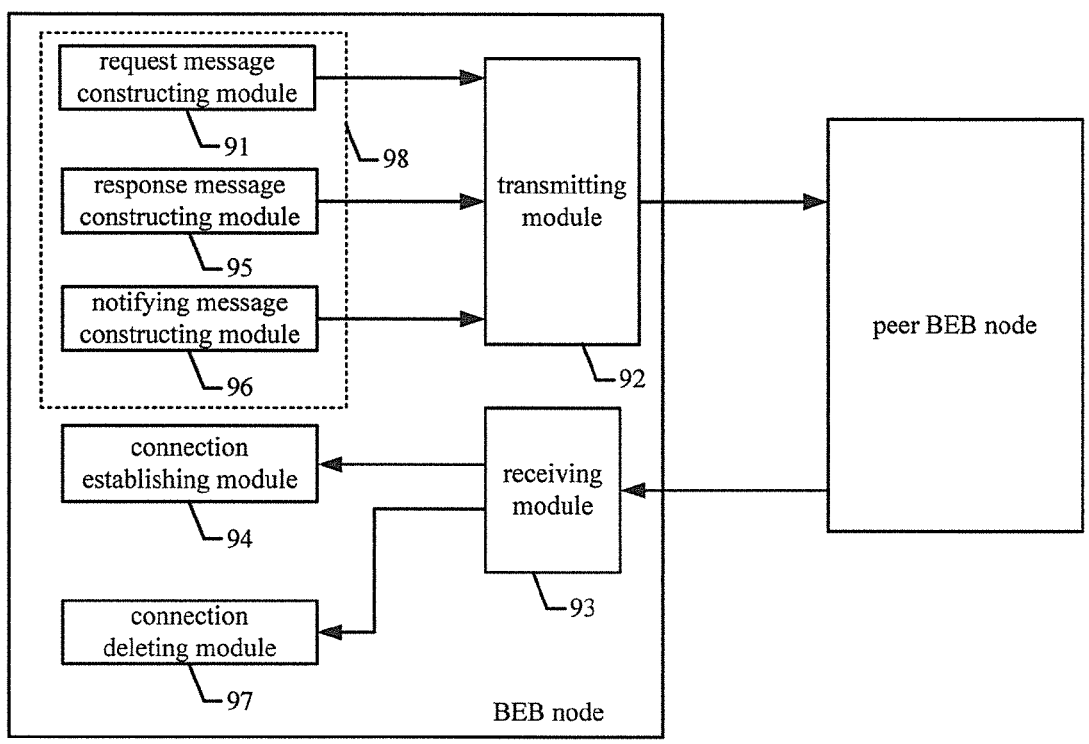
FIG. 8a is a schematic diagram illustrating the structure of a BEB node according to an example.

Further, based on the above mentioned method and system, a BEB node is put forward in an example. Referring to FIG. 8a, the BEB node includes at least one of the following modules: a message constructing module 98, a transmitting module 92, a receiving module 93, a connection establishing module 94 and a connection deleting module 97. Specifically, the message constructing module 98 may include one or more of the following modules: a request message constructing module 91, a response message constructing module 95 and a notifying message constructing module 96.

In an exemplary implementation, the BEB node includes: a request message constructing module 91, a response message constructing module 95, a transmitting module 92, a receiving module 93 and a connection establishing module 94.

The request message constructing module 91 is adapted for constructing a PW connection requesting message, and transmitting the PW connection requesting message to the transmitting module 92.

The response message constructing module 95 is adapted for constructing a PW response message, and transmitting the PW response message to the transmitting module 92.

The transmitting module 92 is adapted for transmitting the PW connection requesting message or the PW response message.

The receiving module 93 is adapted for receiving the PW connection requesting message or the PW response message, and sending the PW connection requesting message or the PW response message to the connection establishing module 94.

The connection establishing module 94 is adapted for establishing a first remote PW connection after it is determined according to the PW connection requesting message that the same PBB instance exists; or establishing a second remote PW connection after receiving the PW response message.

Further, the BEB node includes: a notifying message constructing module 96 and a connection deleting module 97.

The notifying message constructing module 96 is adapted for constructing a PW notifying message when a PBB instance established in the BEB node is to be deleted, and sending the PW notifying message to the transmitting module 92.

The connection deleting module 97 is adapted for deleting the established second remote PW connection when the PBB instance is to be deleted; or deleting the established first remote PW connection after receiving the PW notifying message.

The transmitting module 92 is further adapted for transmitting the PW notifying message.

The receiving module 93 is further adapted for receiving the PW notifying message, and sending it to the connection deleting module 97.

In an exemplary implementation, a 802.1ah header encapsulation format can be adopted for encapsulating the PW connection requesting message, the PW response message and the PW notifying message.

Specifically, the PW connection requesting message can be transmitted in a broadcast mode or in a unicast mode; and the PW response message and the PW notifying message can be transmitted in a unicast mode.

Figure 8B:
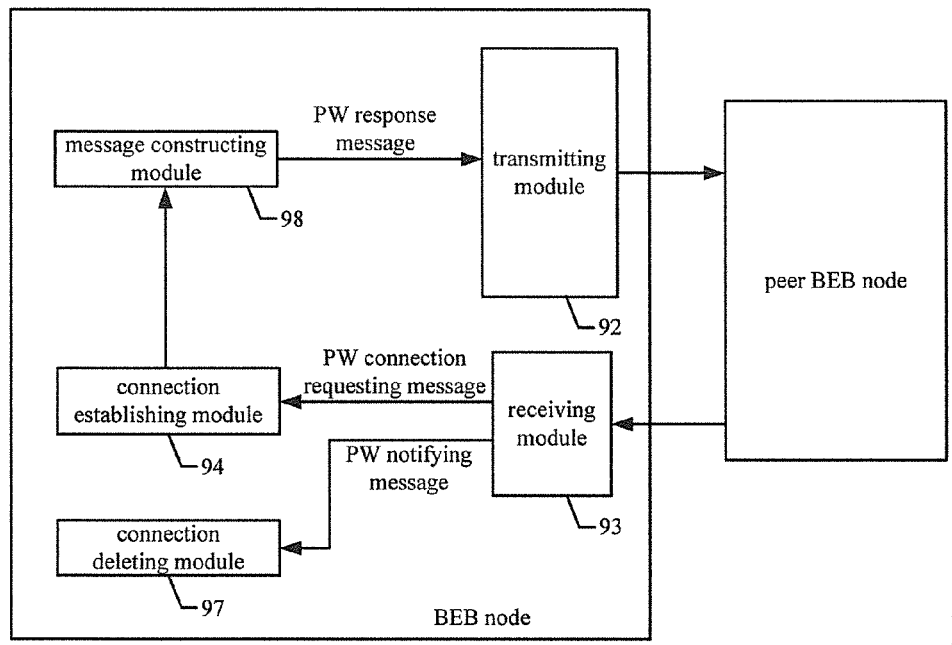
FIG. 8b is a schematic diagram illustrating the structure of a BEB node according to another example.

In an example as shown in FIG. 8b, a Backbone Edge Bridge (BEB) node in Provider Backbone Bridge (PBB) network, comprising: a message constructing module 98, a receiving module 93, a transmitting module 92 and a connection establishing module 94;

wherein the receiving module 93 is adapted for receiving a Pseudo Wire (PW) connection requesting message sent out by a peer BEB node;

the connection establishing module 94 is adapted for establishing a remote PW connection to the peer BEB node, and triggering the message constructing module to construct a PW response message when it is determined that the BEB node has the same PBB instance as that indicated in the PW connection requesting message;

the message constructing module 98 is adapted for constructing the PW response message and providing the PW response message to the transmitting module 92; and the transmitting module 92 is adapted for transmitting the PW response message to the peer BEB node.

The receiving module 93 is further adapted for receiving a PW notifying message sent out by the peer BEB node; and the BEB node further comprises: a connection deleting module 97, adapted for deleting the remote PW connection to the peer BEB node when the PW notifying message is received by the receiving module 93.

Figure 8C:
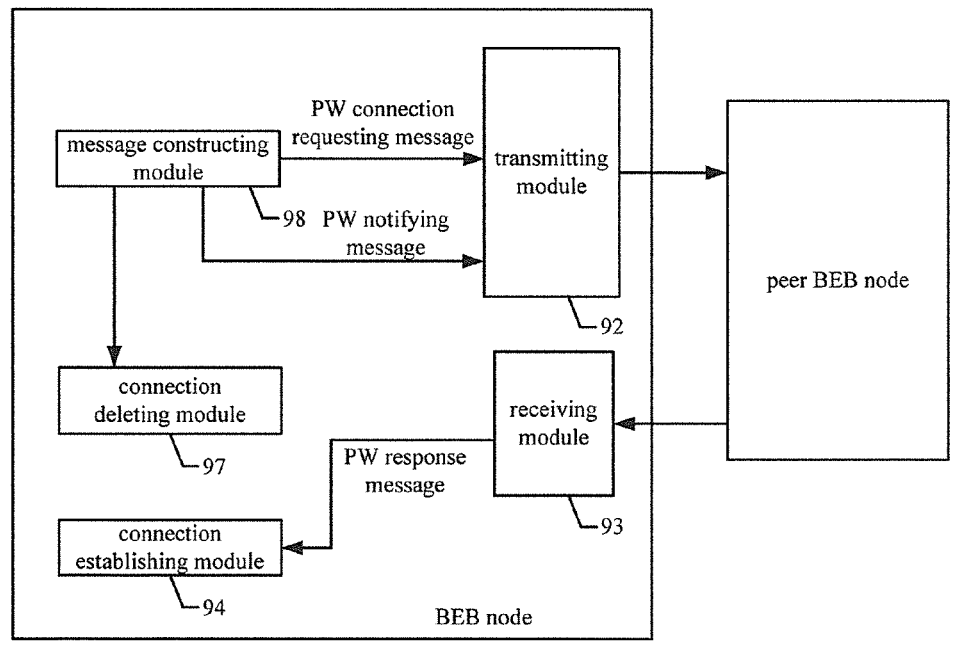
FIG. 8c is a schematic diagram illustrating the structure of a BEB node according to yet another example.

In an example as shown in FIG. 8c, a Backbone Edge Bridge (BEB) node in Provider Backbone Bridge (PBB) network is provided, which includes: a message constructing module 98, a receiving module 93, a transmitting module 92 and a connection establishing module 94;

wherein the message constructing module 98 is adapted for constructing a PW connection requesting message when the BEB node has a PBB instance, and providing the PW connection requesting message to the transmitting module 92;

the transmitting module 92 is adapted for transmitting the PW connection requesting message to a peer BEB node;

the receiving module 93 is adapted for receiving a PW response message sent out by the peer BEB node; and the connection establishing module 94 is adapted for establishing a remote PW connection to the peer BEB node after the PW response message is received by the receiving module 93.

The message constructing module 98 is further adapted for constructing a PW notifying message when the PBB instance of the BEB node is deleted and informing a connection deleting module 97, and providing the PW notifying message to the transmitting module 92;

the transmitting module 92 is further adapted for transmitting the PW notifying message to the peer BEB node; and the BEB node further comprises: the connection deleting module 97, adapted for deleting the remote PW connection to the peer BEB node when the PBB instance of the BEB node is deleted.

That is, a BEB node can receive a PW connection requesting message from a peer BEB node, feed a PW response message back to the peer BEB node, and receive a PW notifying message from the peer BEB node. Certainly, a BEB node can sent out a PW connection requesting message to a peer BEB node, receive a PW response message from the peer BEB node, and sent out a PW notifying message when a PBB instance established in the BEB node is deleted.

Moreover, specific work flow of the BEB node can be found in such as FIG. 3 and FIG. 6, which may not be described repeatedly hereinafter.

It can be seen that, a method for implementing protocol connection in a PBB network is provided in an example, which can reduce or eliminate invalid broadcast messages within the PBB network. Also, a system for implementing protocol connection in a PBB network and a BEB node are provided in an example, which can reduce or eliminate invalid broadcast messages within the PBB network.

In one example, a method for implementing protocol connection in a PBB network includes: when a local BEB node of the PBB network has a PBB instance, the local BEB node constructs a PW connection requesting message, and transmits the message to a remote BEB node of the PBB network;

the BEB nodes at the opposite end receives the PW connection requesting message, establishes a first remote PW connection to the local BEB node when it is determined according to the PW connection requesting message that the remote BEB node has the same PBB instance as that of the local BEB node, and constructs a PW response message and feeds the PW response message back to the local BEB node;

the local BEB node receives the PW response message, and establishes a second remote PW connection to the remote BEB node.

In another example, a system for implementing protocol connection in a PBB network includes: a local BEB node, adapted to construct a PW connection requesting message when the local BEB node has a PBB instance, and transmit it to a remote BEB node of the PBB network; receive a PW response message sent out from the remote BEB node, and establish a second remote PW connection to the remote BEB node;

the remote BEB node, adapted to receive the PW connection requesting message, establish a first remote PW connection to the local BEB node when it is determined according to the PW connection requesting message that the remote BEB node has the same PBB instance as that of the local BEB node of the PBB network, construct the PW response message and feed it back to the local BEB node.

In another example, a BEB node for implementing protocol connection in a PBB network includes: a request message constructing module, a response message constructing module, a transmitting module, a receiving module and a connection establishing module.

The request message constructing module is adapted for constructing a PW connection requesting message, and sending the PW connection requesting message to the transmitting module.

The response message constructing module is adapted for constructing a PW response message, and sending the PW response message to the transmitting module.

The transmitting module is adapted for transmitting the PW connection requesting message or the PW response message.

The receiving module is adapted for receiving the PW connection requesting message or the PW response message, and sending the PW connection requesting message or the PW response message to the connection establishing module.

The connection establishing module is adapted for establishing a first remote PW connection when it is determined according to the PW connection requesting message that the same PBB instance exists; or establishing a second remote PW connection after receiving the PW response message.

In view of the above, a method and system for managing protocol connection in Provider Backbone Bridge (PBB) network and a Backbone Edge Bridge (BEB) node provided in an example of the present disclosure mainly includes: a first BEB node in the PBB network receives a Pseudo Wire (PW) connection requesting message, wherein the PW connection requesting message is sent out by a second BEB node when the second BEB node has a PBB instance; when it is determined according to the PW connection requesting message that the first BEB node has the same PBB instance as that of the second BEB node, the first BEB node feeds a PW response message back to the second BEB node, and establishes protocol connection between the first BEB node and the second BEB node for forwarding backbone frame.

Specifically, according to an example, before forwarding backbone frame, remote PW connections are established in advance between two BEB nodes having the same PBB instance, that is, protocol connection is carried out in the PBB network. In this way, remote PW connections contained in the PBB instance, which are established in advance, can be used for forwarding backbone frame. That is, protocol connection can be established according to the existence of PBB instance, and backbone frame is further transmitted by using the established protocol connection, thereby reducing or eliminating invalid broadcast messages that may appear throughout the PBB network.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method for managing protocol connection in Provider Backbone Bridge (PBB) network, comprising:
   receiving, by a first Backbone Edge Bridge (BEB) node in the PBB network, a Pseudo Wire (PW) connection requesting message, wherein the PW connection requesting message is sent by a second BEB node when the second BEB node has a PBB instance, wherein the receiving of the PW connection requesting message initiates a procedure of establishing a protocol connection between the first BEB node and a second BEB node;
   determining, by the first BEB node based on the PW connection requesting message, whether the first BEB node has a same PBB instance as the PBB instance of the second BEB node;
   in response to a determination that the first BEB node has the same PBB instance as the PBB instance of the second BEB node, sending, by the first BEB node, a PW response message to the second BEB node and establishing, by the first BEB node, a protocol connection between the first BEB node and the second BEB node for forwarding backbone frame; and
   in response to a determination that the first BEB node does not have the same PBB instance as the PBB instance of the second BEB node, ending, by the first BEB node, the procedure of establishing a protocol connection between the first BEB node and the second BEB node.

2. The method according to claim 1, wherein establishing the protocol connection between the first BEB node and the second BEB node for forwarding backbone frame comprises:
   establishing, by the first BEB node, a first remote PW connection to the second BEB node; and
   establishing, by the second BEB node, a second remote PW connection to the first BEB node after receiving the PW response message.

3. The method according to claim 2,
   wherein, establishing, by the first BEB node, the first remote PW connection to the second BEB node comprises: setting a tunnel termination table and a local forwarding table corresponding to the PBB instance in the first BEB node; and
   wherein, establishing, by the second BEB node, the second remote PW connection to the first BEB node comprises: setting a tunnel termination table and a local forwarding table corresponding to the PBB instance in the second BEB node.

4. The method according to claim 2, further comprising:
   constructing, by the second BEB node, a PW notifying message when the PBB instance of the second BEB node is deleted, transmitting the PW notifying message to the first BEB node, and deleting the second remote PW connection; and
   receiving, by the first BEB node, the PW notifying message, and deleting the first remote PW connection in response to a determination according to the PW notifying message that the first BEB node has the same PBB instance as the PBB instance of the second BEB node being deleted and the PBB instance of the first BEB node includes the first remote PW connection to the second BEB node.

5. The method according to claim 4, wherein determining according to the PW notifying message that the first BEB node has the same PBB instance as the PBB instance of the second BEB node being deleted and the PBB instance of the first BEB node includes the first remote PW connection to the second BEB node comprises:
   fetching, by the first BEB node, a service identifier number (I-SID) from the PW notifying message, and determining that the PBB instance of the first BEB node includes the first remote PW connection when the I-SID contained in the PW notifying message and the I-SID of the PBB instance of the first BEB node are the same and the first BEB node stores the corresponding tunnel termination table and local forwarding table.

6. The method according to claim 4,
   wherein deleting, by the second BEB node, the second remote PW connection comprises: deleting the corresponding tunnel termination table and local forwarding table in the second BEB node; and
   wherein deleting, by the first BEB node, the first remote PW connection comprises: deleting the corresponding tunnel termination table and local forwarding table in the first BEB node.

7. The method according to claim 4, further comprising: adopting a 802.1ah header encapsulation format to construct the PW connection requesting message, the PW response message or the PW notifying message.

8. The method according to claim 4, wherein the PW connection requesting message is transmitted in a broadcast mode or in a unicast mode; and
   the PW response message or the PW notifying message is transmitted in a unicast mode.

9. The method according to claim 1, further comprising:
   constructing, by the second BEB node, the PW connection requesting message and transmitting the message when the PBB instance is initially established at the second BEB node; or
   periodically constructing, by the second BEB node, the PW connection requesting message and transmitting the message when the PBB instance has already been established at the second BEB node.

10. The method according to claim 1, wherein determining, by the first BEB node based on the PW connection requesting message, whether the first BEB node has the same PBB instance as the PBB instance of the second BEB node comprises:
    fetching, by the first BEB node, a service identifier number (I-SID) from the PW connection requesting message, and
    determining that the first BEB node has the same PBB instance as the PBB instance of the second BEB node when the I-SID contained in the PW connection requesting message is the same as an I-SID of the PBB instance of the first BEB node.

11. The method according to claim 1, wherein the PW connection requesting message further comprises bandwidth requirement; and
    the method further comprises:
    fetching, by the first BEB node, the bandwidth requirement from the PW connection requesting message, and
    configuring a bandwidth of the protocol connection according to the bandwidth requirement.

12. A system for managing protocol connection in Provider Backbone Bridge (PBB) network, comprising:
a first Backbone Edge Bridge (BEB) node to:
receive a Pseudo Wire (PW) connection requesting message from a second BEB node in the PBB network, wherein receiving the PW connection requesting message initiates a procedure of establishing a protocol connection between the first PEP node and a second BEB node;
determine, based on the PW connection requesting message, whether the first BEB node has a same PBB instance as a PBB instance of the second BEB node;
in response to a determination that the first BEB node has the same PBB instance as the PBB instance of the second BEB node in the PBB network, establish a first remote PW connection to the second BEB node, construct a PW response message and send the PW response message to the second BEB node; and
in response to a determination that the first BEB node does not have the same PBB instance as the PBB instance of the second BEB node, end the procedure of establishing a protocol connection between the first BEB node and the second BEB node; and
the second BEB node to construct the PW connection requesting message when the second BEB node has the PBB instance, transmit the PW connection requesting message to the first BEB node, and establish a second remote PW connection to the first BEB node after receiving the PW response message from the first BEB node.

13. The system according to claim 12, wherein the second BEB node is to:
construct the PW connection requesting message and transmitting the message when the PBB instance is initially established at the second BEB node; or
periodically construct the PW connection requesting message and transmitting the message when the PBB instance has already been established at the second BEB node.

14. The system according to claim 12, wherein, to determine whether the first BEB node has the same PBB instance as the PBB instance of the second BEB node, the first BEB node is to:
fetch a service identifier number (I-SID) from the PW connection requesting message, and
determine that the first BEB node has the same PBB instance as the PBB instance of the second BEB node when the I-SID contained in the PW connection requesting message is the same as the I-SID of the PBB instance of the first BEB node.

15. The system according to claim 12, wherein
the second BEB node is further to construct a PW notifying message when the PBB instance of the second BEB node is deleted, transmit the PW notifying message to the first BEB node, and delete the second remote PW connection; and
the first BEB node is further to receive the PW notifying message, and delete the first remote PW connection in response to a determination according to the PW notifying message that the first BEB node has the same PBB instance as the PBB instance of the second BEB node being deleted and the PBB instance of the first BEB node includes the first remote PW connection to the second BEB node.

16. The system according to claim 15, wherein the first BEB node is to:
fetch a service identifier number (I-SID) from the PW notifying message, and
determine that the PBB instance of the first BEB node includes the first remote PW connection when the I-SID contained in the PW notifying message and the I-SID of the PBB instance of the first BEB node are the same and the first BEB node stores the corresponding tunnel termination table and local forwarding table.

17. A Backbone Edge Bridge (BEB) node in Provider Backbone Bridge (PBB) network, comprising: a message constructing module, a receiving module, a transmitting module and a connection establishing module;
wherein the receiving module is to receive a Pseudo Wire (PW) connection requesting message sent by a peer BEB node, wherein receiving the PW connection requesting message initiates a procedure of establishing a protocol connection between the BEB node and the peer BEB node;
the connection establishing module is to determine whether the BEB node has a same PBB instance as a PBB instance of the peer BEB node indicated in the PW connection requesting message, establish a remote PW connection to the peer BEB node, and trigger the message constructing module to construct a PW response message in response to a determination that the BEB node has the same PBB instance as the PBB instance of the peer BEB node indicated in the PW connection requesting message,
wherein, in response to a determination that the BEB node does not have the same PBB instance as the PBB instance of the peer BEB node, the connection establishing module is to end the procedure of establishing a protocol connection between the BEB node and the peer BEB node;
the message constructing module is to construct the PW response message and provide the PW response message to the transmitting module; and
the transmitting module is to transmit the PW response message to the peer BEB node.

18. The BEB node according to claim 17, wherein the receiving module is further to receive a PW notifying message sent by the peer BEB node; and
the BEB node further comprises: a connection deleting module to delete the remote PW connection to the peer BEB node when the PW notifying message is received by the receiving module.

19. A Backbone Edge Bridge (BEB) node in Provider Backbone Bridge (PBB) network, comprising: a message constructing module, a receiving module, a transmitting module and a connection establishing module;
wherein the message constructing module is to construct a PW connection requesting message when the BEB node has a PBB instance, and provide the PW connection requesting message to the transmitting module;
the transmitting module is to transmit the PW connection requesting message to a peer BEB node, wherein the transmission of the PW connection requesting message initiates a procedure by the peer BEB node to establishing a protocol connection between the BEB node and the peer BEB node;
the receiving module is to receive a PW response message sent by the peer BEB node in response to a determination by the peer BEB node that the peer BEB node has a same PBB instance as the PBB instance of the BEB node, wherein the peer BEB node is to end the procedure of establishing a protocol connection between the BEB node and the peer BEB node if the peer BEB node does not have the same PBB instance as the PBB instance of the BEB node; and the connection establishing module is to establish a remote PW connection to the peer BEB node after the PW response message is received by the receiving module.

20. The BEB node according to claim 19, wherein the message constructing module is to construct a PW notifying message when the PBB instance of the BEB node is deleted and inform a connection deleting module, and provide the PW notifying message to the transmitting module;

the transmitting module is further to transmit the PW notifying message to the peer BEB node; and the connection deleting module is to delete the remote PW connection to the peer BEB node when the PBB instance of the BEB node is deleted.

\* \* \* \* \*